Jan. 10, 1939.　　　　S. G. GREEN　　　2,143,005
CLAMP
Filed Dec. 18, 1936
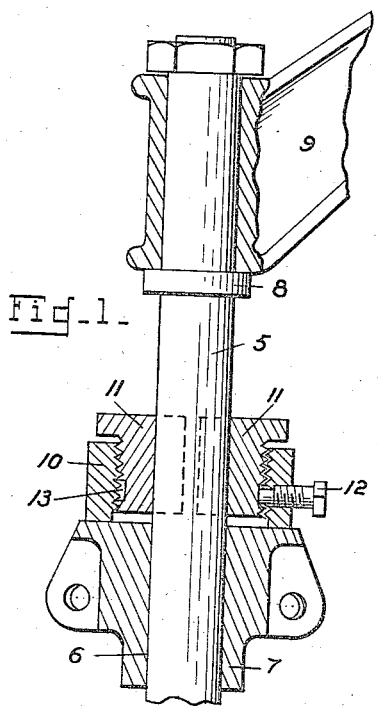
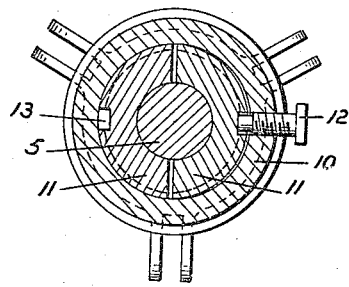
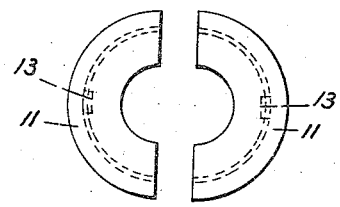
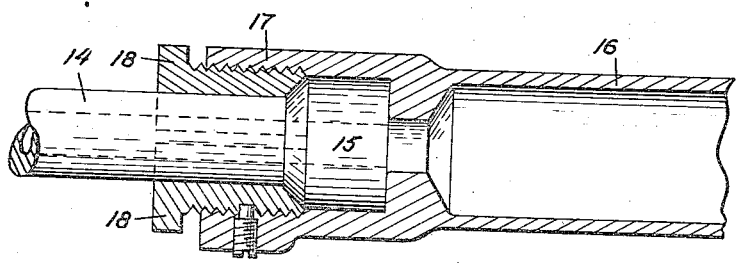
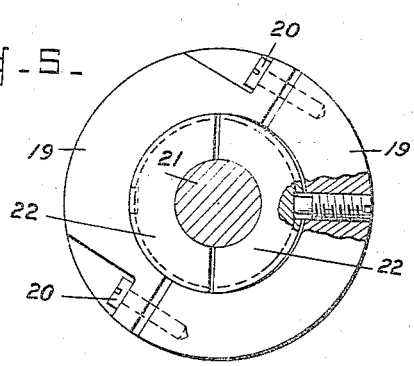
Inventor
Samuel G. Green
By W. N. Roach
Attorney Patented Jan. 10, 1939

2,143,005

UNITED STATES PATENT OFFICE 2,143,005

CLAMP

Samuel G. Green, Gray, Ga.

Application December 18, 1936, Serial No. 116,550

2 Claims. (Cl. 248—157)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a clamp.

The purpose of the invention is to provide a simple and efficient clamp which may be readily applied to a shaft without modifying the shaft.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in elevation of a shaft with the improved clamp shown in section.

Fig. 2 is a sectional view on the line 2—2 of Fig. 1.

Fig. 3 is a plan view of the sectional liner.

Fig. 4 is a longitudinal sectional view showing the application of the invention to the problem of mounting an attachment on a gun barrel.

Fig. 5 is a view in end elevation with parts in section showing the clamp provided with a two-part nut.

The invention is illustrated in connection with a tripod in which a cylindrical standard or shaft 5 extends through an aperture 6 in a tripod head 7. The upper portion of the shaft is provided with a flange or collar 8 for supporting a bracket 9 that is rotatably mounted on the end of the rod.

The clamp consists of a nut 10 having an internal diameter greater than the collar 8 and a sectional sleeve or liner comprising a pair of segments 11—11 threadly engaging the nut and adapted to embrace the shaft 5. A set screw 12 threaded in the nut has its inner end movable into a recess 13 provided in one or in each of the segments.

When the set screw is threaded into the nut it engages one of the segments and causes it to bear against the shaft 5 after which further rotation of the set screw will displace the nut and cause the opposite segment to bear against the shaft. The clamp is now fixed on the shaft and when brought into engagement with the tripod head 7 it will limit lowering of the shaft. The clamp may be moved to a different position on the shaft after loosening the set screw 12.

It will be noted that obstructions or enlargements such as the collar 8 will not interfere with the application of the sectional liner to the shaft and to the nut. With the bracket 9 removed, the nut 10 may be moved past the collar 8.

While the clamp is shown mounted on a vertical shaft it is obvious that it may equally as well have other applications.

In Fig. 4 a gun barrel 14 having an enlarged muzzle 15 is to carry a muzzle attachment 16. The rear end 17 of the attachment is threaded to constitute a nut which engages a segmental liner 18—18 embracing the barrel in rear of the muzzle.

In Fig. 5 the outer nut member is formed in two parts 19—19 held together by screws 20. This construction is used when the diameter of the nut is not large enough to pass over other elements on the shaft 21. The sectional liner 22—22 is first applied to the shaft and the sectional nut 19—19 is applied to the sectional liner or mounted on the shaft at one side of the liner and secured by the screws 20.

I claim:

1. In combination with a shaft, a nut encircling the shaft in radially spaced relation and adapted to abut a stationary support for the shaft, a sectional liner embracing the shaft and having external V-threads engaging corresponding threads of the nut, said liner adapted when in engagement with the nut, to have longitudinal movement relative thereto, a set screw threaded in the nut and engageable with one of the sections, said set screw acting directly and through the nut to move all of the sections of the liner into clamping engagement with the shaft while maintaining threaded engagement between the liner and nut to place the axial load of the shaft and liner on the threads.

2. In a support of the type provided with a bore for axially guiding a shaft, means for forming an abutment on the shaft engageable with the support to limit axial movement of the shaft comprising in combination an internally V-threaded nut of uniform diameter adapted to encircle the shaft in radially spaced relation, a liner including a plurality of arcuate spaced segments arranged to define a bore adapted to embrace the shaft, said segments being externally V-threaded on a uniform diameter for interthreaded engagement with the internally threaded nut and circumferentially contractible within the nut to frictionally engage the shaft throughout the bore defined thereby, a single set screw threaded into the nut and engageable with one of said segments to radially displace the nut and segments relative to each other to effect circumferential contraction of the liner, said liner being relatively longitudinally movable with respect to the nut when in engagement whereby a load imposed on the liner will tend to contract it due to the wedging action of the interthreaded engagement of the liner and nut.

SAMUEL G. GREEN.